(12) United States Patent  (10) Patent No.: US 7,281,176 B2
Eldredge  (45) Date of Patent: Oct. 9, 2007

(54) DETERMINING SIGNAL QUALITY AND SELECTING A SLICE LEVEL VIA A FORBIDDEN ZONE

(75) Inventor: Adam B. Eldredge, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 530 days.

(21) Appl. No.: 10/977,518

(22) Filed: Oct. 29, 2004

(65) Prior Publication Data

US 2006/0095814 A1    May 4, 2006

(51) Int. Cl.
  *H03M 13/33* (2006.01)
(52) U.S. Cl. ............. 714/709; 375/225; 375/226; 375/243; 375/285; 375/355; 375/371; 714/701
(58) Field of Classification Search ........ 375/225–226, 375/243, 285, 355, 371; 714/704, 709
  See application file for complete search history.

(56) References Cited

U.S. PATENT DOCUMENTS

| 3,721,959 | A  | * | 3/1973  | George ..................... 714/704 |
| 6,178,213 | B1 |   | 1/2001  | McCormack et al. ....... 375/355 |
| 6,463,109 | B1 |   | 10/2002 | McCormack et al. ....... 375/355 |
| 6,630,868 | B2 |   | 10/2003 | Perrott et al. ................ 331/17 |
| 6,657,488 | B1 |   | 12/2003 | King et al. .................... 330/9 |
| 6,741,846 | B1 |   | 5/2004  | Welland et al. ............. 455/260 |
| 6,856,206 | B1 |   | 2/2005  | Perrott ........................ 331/25 |
| 6,988,227 | B1 | * | 1/2006  | Perrott ...................... 714/704 |
| 7,020,227 | B1 | * | 3/2006  | Wang et al. ................. 375/355 |
| 2002/0009167 | A1 | * | 1/2002 | Farjad-Rad .................. 375/355 |
| 2004/0005021 | A1 | * | 1/2004 | Moon et al. ................. 375/355 |
| 2004/0125874 | A1 | * | 7/2004 | Baumert ..................... 375/226 |

FOREIGN PATENT DOCUMENTS

WO    WO 2004/100380 A1    11/2004    ............... 7/23

OTHER PUBLICATIONS

Si5010—Product Brief. Silicon Laboratories. Dec. 2004.
"Data conversion in SONET/SDH systems", A Muhlschein. Electronics Engineer. Jun. 2000.
"A 5-Gb/s 0.25μm CMOS Jitter-Tolerant Variable-Interval Oversampling Clock/Data Recovery Circuit". Lee, Sang-Hyun; Moon-Sang Hwang, Youngdon Choi, Sungjoon Kim, Young-June Park, and Gijung Ahn. *IEEE Journal Of Solid-State Circuits*, vol. 37, No. 12, pp. 1822-1830. Dec. 2002.
"Rate-Independent CDR Chip Locks In At Up To 2.7 Gbits/s". Mannion, Patrick. *Electronic Design*. www.elecdesign.com. Mar. 20, 2000.
OC-48 Optical Networking Solutions—Solutions Guide. Silicon Laboratories. May 2003.
Si5022/23 Multi-Rate Sonet/SDH CDR IC with Integrated Limiting Amplifier—Product Brief. Silicon Laboratories. May 2001.

* cited by examiner

*Primary Examiner*—R. Stephen Dildine
(74) *Attorney, Agent, or Firm*—Trop, Pruner & Hu, P.C.

(57) ABSTRACT

In one embodiment, a method may determine a number of data transitions occurring in a forbidden zone at each of a first and second slice levels and adjust a slice level offset for an amplifier based on the number of data transitions at the first and second slice levels. Furthermore, a phase window of the forbidden zone may be adjusted to attain a desired bit error rate for a receiver.

29 Claims, 6 Drawing Sheets

DETERMINING SIGNAL QUALITY AND SELECTING A SLICE LEVEL VIA A FORBIDDEN ZONE

FIELD OF THE INVENTION

The present invention relates to data communication and more particularly to acquiring data and clock signals associated with the data communication.

BACKGROUND

Communication systems often transmit data with a clock embedded in a data stream, rather than being sent as a separate signal. When the data stream is received, a clock and data recovery circuit (CDR) recovers the embedded clock and retimes the received data to the recovered clock. Typically, a phase-locked loop (PLL) is used to perform the clock recovery operation. Such a PLL typically includes a phase detector, which receives the input data signal and a clock signal from a voltage-controlled oscillator (VCO). The phase detector generates an error signal, which is a function of the phase difference between the input data signal and the VCO clock signal. The phase detector may also include additional circuitry to generate the reconstructed data.

The data stream is used to transmit digital information at high data rates. For data to be reliably transmitted and received, a system typically has a low bit error rate (BER). Typically, the BER is determined by counting the number of data transitions occurring within a certain time frame of a data eye.

Oftentimes, a CDR is implemented in an integrated circuit along with additional components, such as a limit amplifier (LA) and other such components. The LA may receive a voltage signal from a transimpedance amplifier (TIA) or other amplifier, which amplifies an incoming converted optical signal. Instead of a LA, an automatic gain control (AGC) amplifier may be used.

The function of the limit amplifier is to produce a consistent waveform from a TIA output which can be used by the CDR, regardless of incoming optical energy. In addition to amplifying the input signal, the LA may provide an adjustable slicing level to compensate for an asymmetric noise characteristic present in the incoming data. A slicing level is the threshold voltage at which an incoming signal is determined to be either a "1" bit or a "0" bit. At low levels of optical energy (corresponding to a zero bit level for example), the noise current is low. At higher levels of optical energy (corresponding to a one bit), the noise current may be higher.

Further, asymmetry in voltage levels corresponding to "1" and "0" level bits may exist, as shown in FIG. 1, which is a timing diagram of a typical data eye of incoming data. As shown in FIG. 1, at a slicing level of 0 mV, the horizontal opening of the data eye 5 is smaller than the horizontal opening at a slicing level of −0.2 mV. Thus, a slicing level of zero may give a smaller amount of margin for the positive swing compared to the negative swing. In FIG. 1, the data eye 5 is shown to have its widest opening at a slicing level of −0.2 mV. If the slicing level is set to roughly −2 mV in the case shown, the margin is more symmetric and better results are possible. This asymmetry may require an introduction of an intentional offset to create the most reliable output. Thus, introducing a small offset serves to optimize noise margin and signal strength. Current approaches for determining a slice offset typically require additional circuitry, consuming semiconductor real estate and power.

Accordingly, a need exists for improved analysis of signal quality and an improved manner of determining a slice level offset for an amplifier in a signal path.

SUMMARY OF THE INVENTION

In certain embodiments, the present invention includes various methods of adjusting a phase window between a sampling clock and an error clock, as well as methods of adjusting a slicing level to be provided to an amplifier. In one embodiment, a method of adjusting a slice level includes determining a number of data transitions occurring in a forbidden zone at first and second slice levels. The forbidden zone may be a phase window established at an edge of a data eye and between a sampling clock and an error clock. Based on the number of data transitions occurring at the two slice levels, a slicing level adjustment may be made to a slice level offset.

In another embodiment, a method of adjusting a phase window may be implemented. Specifically, a number of data transitions occurring in a forbidden zone of a data eye may be determined, and the forbidden zone may be adjusted if the number of data transitions is below or above a predetermined bit error rate.

Such methods may be implemented in hardware or software, or combinations thereof. For example, in one embodiment, an integrated circuit may include an amplifier and a recovery circuit, such as a clock and data recovery circuit. The amplifier may receive both an incoming signal and a slice level input. The recovery circuit may be coupled to the amplifier to receive an output of the amplifier. Furthermore, the recovery circuit may adjust the slice level input based on a comparison of data transitions occurring in a forbidden zone at two different slice levels of the amplifier.

DETAILED DESCRIPTION

Figure 1:
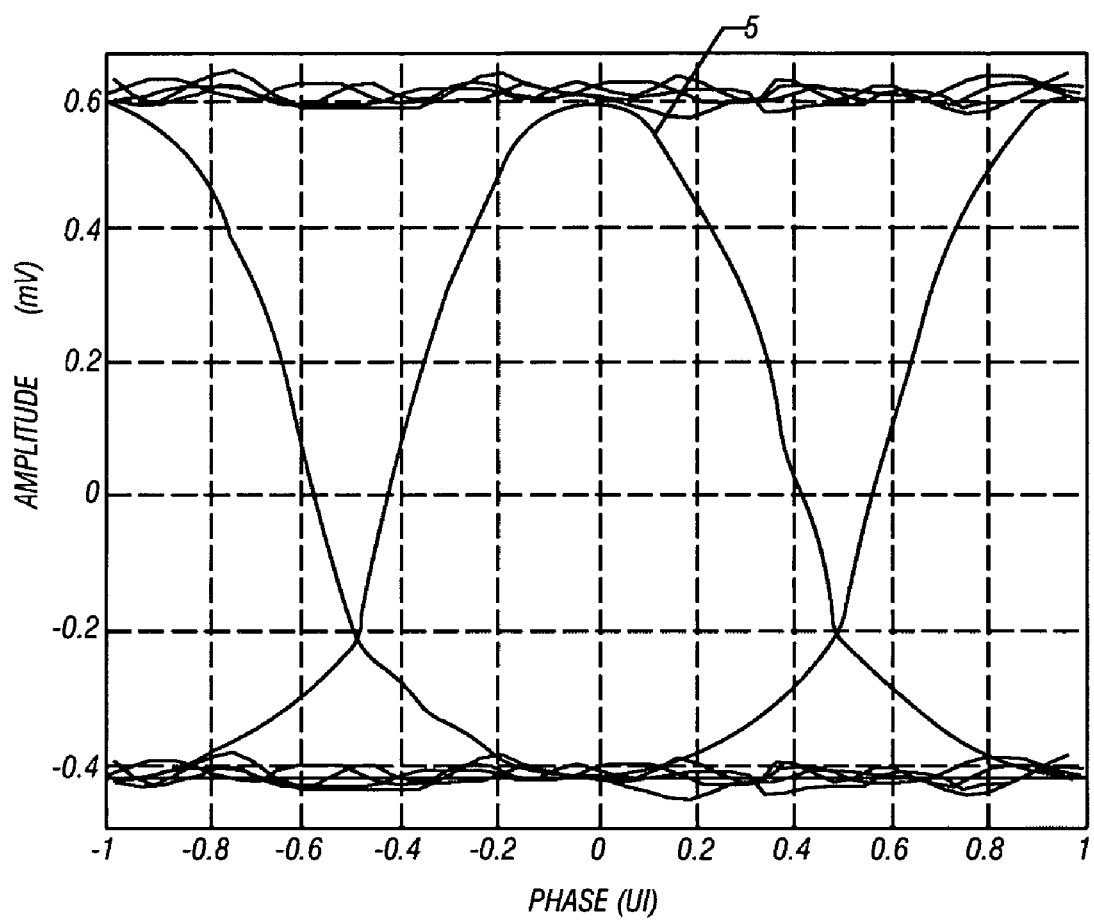
FIG. 1 is a timing diagram of a typical data eye with a slice offset.
Figure 2A:
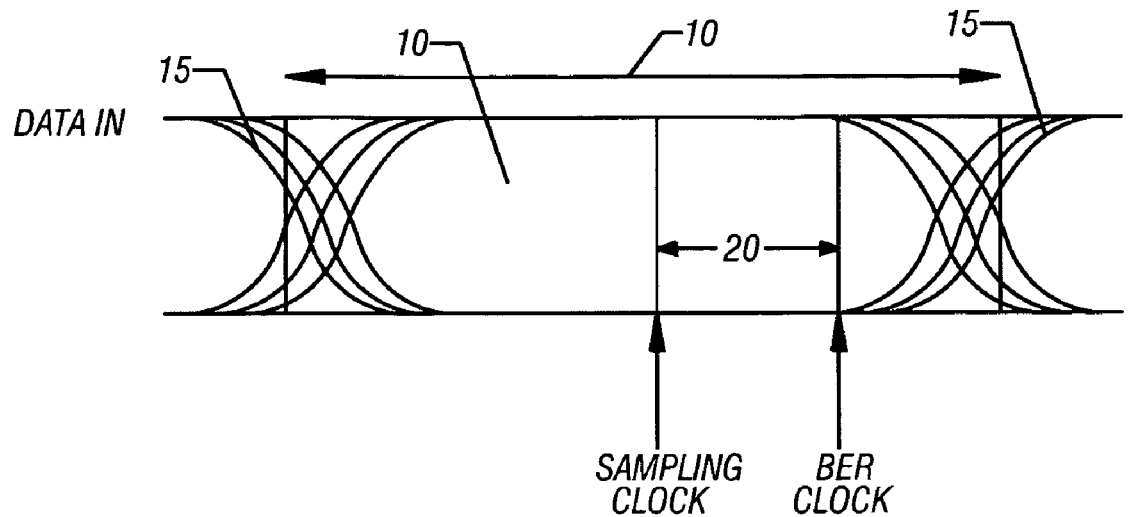
FIG. 2A is a waveform having a typical data eye.

Referring now to FIG. 2A, shown is a waveform having a data eye 10. As shown in FIG. 2A, the waveform may correspond to incoming data (Data In), for example, being input into an optical receiver. Data eye 10 is formed by superimposing waveforms of multiple data signals. As shown in FIG. 2A, the data signals forming data eye 10 have transitions 15 with varied rise times and fall times. While not shown in FIG. 2A, the waveforms may also exhibit different voltage levels and shapes.

Within data eye 10 is a forbidden zone 20, which is a predetermined portion of a period of the sampling clock used to sample data of the waveform. Specifically, forbidden zone 20 corresponds to a phase window between a sampling clock and a bit error rate (BER) clock. When the sampling clock is properly set (i.e., is locked), a limited number of data transitions typically fall into forbidden zone 20. However, when the sampling clock is out-of-lock, more transitions fall into forbidden zone 20. As shown in FIG. 2A, the sampling clock is set at the center of data eye 10, while the BER clock is at the edge of data eye 10.

Figure 2B:
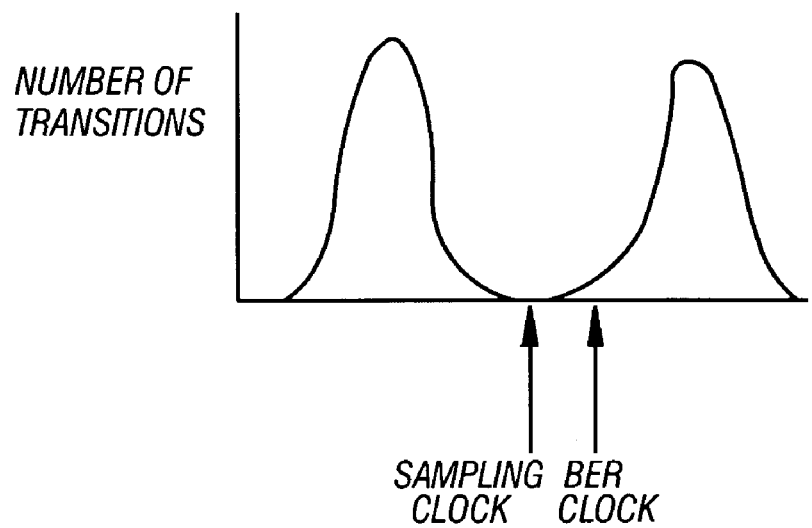
FIG. 2B is a histogram of data transitions for incoming data in accordance with one embodiment of the present invention.

Referring now to FIG. 2B, shown is a histogram of data transitions for incoming data into an optical system such as that represented by data eye 10 of FIG. 2A. As shown in FIG. 2B, if the incoming data is well behaved, the histogram has a gaussian distribution. Accordingly, at the sampling clock phase very few or zero transitions occur, providing for reliable data transmission. By measuring the number of transitions in a given window, the number of transitions at the sampling clock (which correspond to bit errors) can be estimated. However, several problems exist in such an approach. First, the approach assumes that the data crossing histogram is symmetric. The approach also assumes that all jitter in the window has a gaussian shape (i.e., a lack of deterministic jitter, intersymbol interference (ISI) jitter, and the like). Furthermore, if the selected window is too small, there is a statistically insignificant amount of data crossings, which will cause inaccurate BER estimates. In contrast, if the window is too large, the jitter will include deterministic jitter which will cause inaccurate BER estimates.

In various embodiments of the present invention, a phase window, which may correspond to a forbidden zone, may be adjusted to obtain a desired BER for a receiver incorporating a CDR. The adjustable window may be located substantially near an edge of a data eye, allowing the device to continuously monitor the BER. Because the adjustable phase window is located at a boundary of the data eye opening, rather than being swept throughout the data eye, adjusting the phase window and slice level may occur rapidly and accurately. Furthermore, once the device has locked on a sampling phase, the error phase and accordingly, the phase window may not adjust significantly and thus the feedback to the incoming data does not change significantly over time.

Furthermore, in the course of adjusting the phase window, a desired slicing level may be automatically determined without any further measurements or additional circuitry required.

The phase window to be adjusted may correspond a forbidden zone between a sampling clock and a BER clock. To avoid bit errors, data transitions should not occur at a sampling clock phase. Accordingly, the sampling clock phase may be set at a point within a data eye at which few or no data transitions occur. Typically, the sampling clock phase may be set at the center of the data eye. The BER or error clock phase may be located between the sampling clock and an edge of the data eye. For example, the BER clock of FIG. 2A is shown as being to the right side of the sampling clock. However, in other embodiments, an error clock may be located to a left side of the sampling clock.

Figure 3:
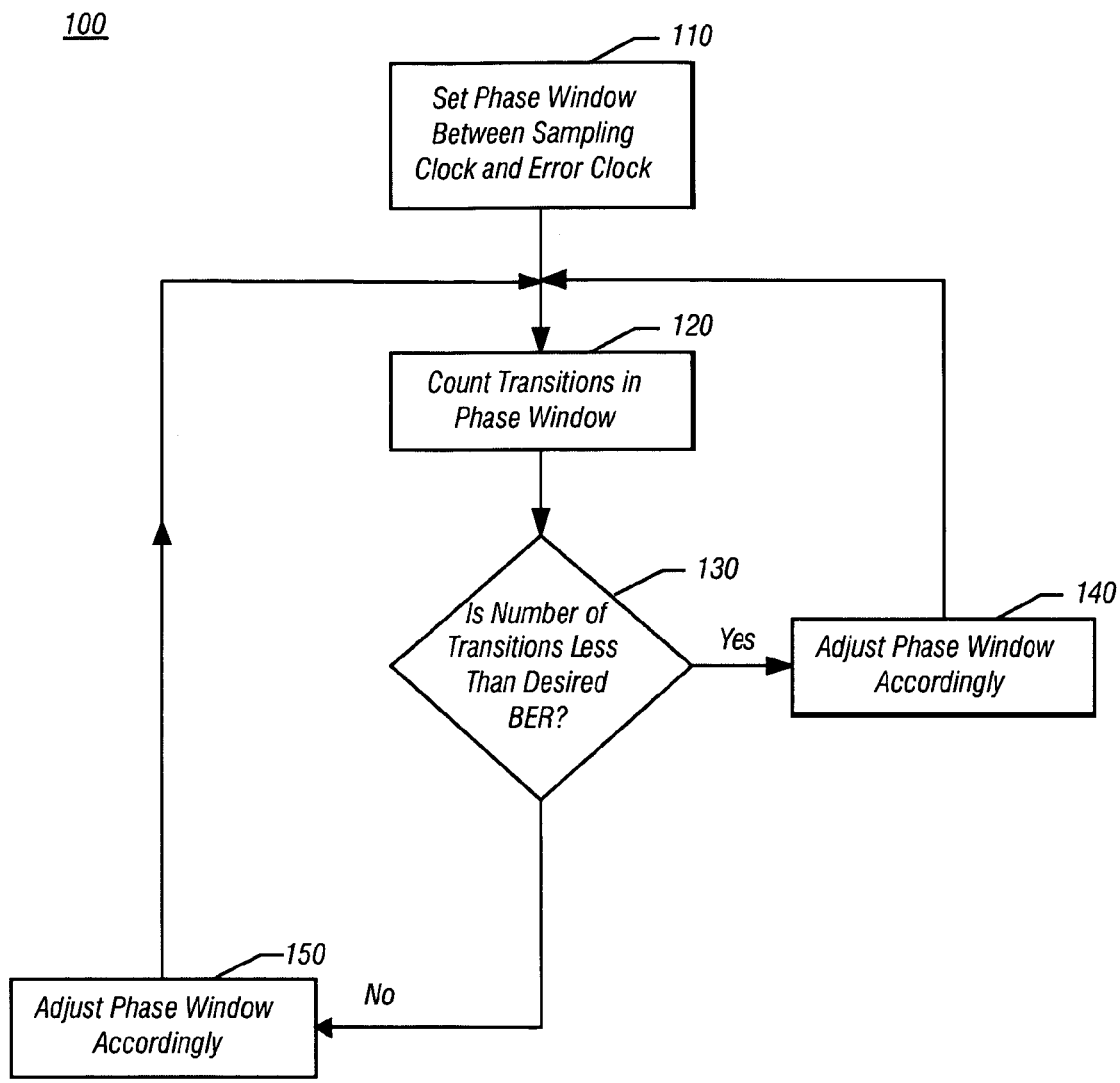
FIG. 3 is a flow diagram of a method to adjust a forbidden zone in accordance with an embodiment of the present invention.

Referring now to FIG. 3, shown is a flow diagram of a method in accordance with one embodiment of the present invention. As shown in FIG. 3, method 100 may be used to adjust a phase window. Method 100 may begin by setting a phase window between the sampling clock and the error clock (block 110). While the size of the phase window may vary in different embodiments, in an embodiment for use in recovering data at a 10 GB/s rate, the phase window may be between approximately 0.100 and 0.400 unit intervals (UI), however the window may be larger or smaller as desired for a particular implementation. This initial phase window size may be automatically set, or may be controlled based on user input, in certain embodiments. Similarly, the sampling clock phase may be initially set automatically or under user control.

Next, the number of transitions occurring in the phase window may be counted (block 120). The number of transitions occurring during the window may be compared to a desired BER. More specifically, it may be determined whether the number of transitions is less than the desired BER (diamond 130). For example, in one embodiment a receiver may have a target BER of approximately $1 \times 10^{-3}$, although the scope of the present invention is not so limited. This target BER may be stored in a register or other storage location for access in comparison to the determined number of transitions. In various embodiments, the target BER may be selected such that it is greater than a minimum amount of data transitions and smaller than an amount that would include deterministic jitter.

If the number of transitions is less than the desired BER, the phase window may be adjusted accordingly (block 140). More specifically, the size of the phase window may be increased. For example, in one embodiment a phase window increment may be added to the current phase window. Such an increment value may vary in different embodiments, and in certain implementations may be between approximately 5 and 20 mUI. In such manner, the BER clock may be adjusted, causing the phase window to be increased. As shown in FIG. 3, control may then return to block 120 to determine the number of transitions occurring in the adjusted phase window.

If instead at diamond 130 it is determined that the number of transitions exceeds the desired BER, control passes to block 150. There, the phase window may be adjusted accordingly (block 150). Specifically, the size of the phase window may be decreased, for example, by a predetermined decrement value. That is, the BER clock may be adjusted, causing the phase window to be decreased. As above, control passes back to block 120.

In such manner, the phase window, which may correspond to a forbidden zone, can be adjusted to maintain the number of data transitions occurring within the phase window between desired BER and deterministic jitter values.

In addition to adjusting the phase window, embodiments of the present invention may be used to automatically adjust a slice level to obtain desired receiver performance. Specifically, a slice level offset to be input into an amplifier of a receive path may be automatically determined using information obtained during the phase window adjustment algorithm discussed above with regard to FIG. 3.

Figure 4:
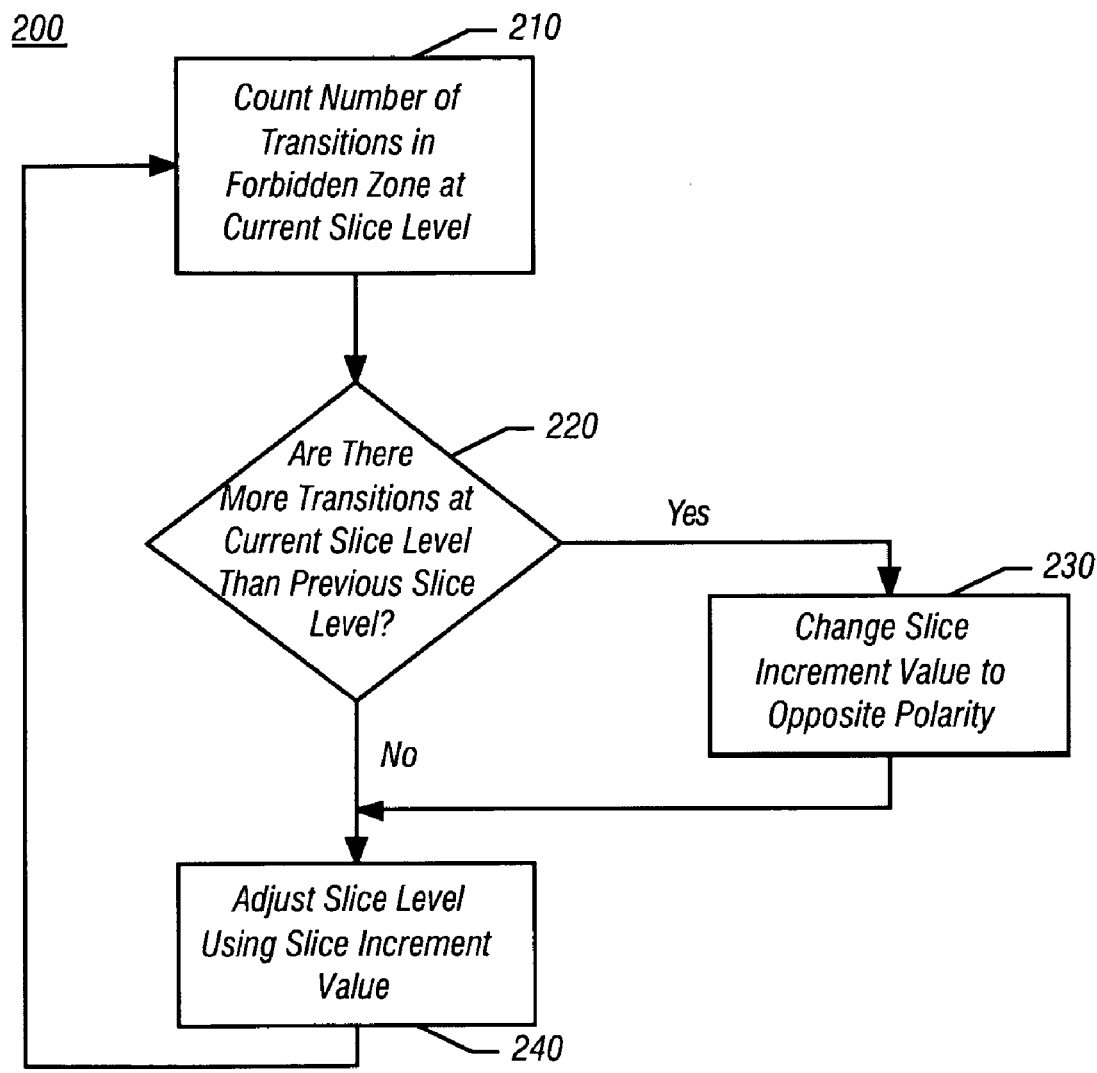
FIG. 4 is a flow diagram of method of adjusting a slice level in accordance with one embodiment of the present invention.

Referring now to FIG. 4, shown is a flow diagram of method of adjusting a slice level in accordance with one embodiment of the present invention. While shown for ease of discussion as a separate flow diagram, it is to be understood that in various embodiments an algorithm for adjusting the slice level may be incorporated within an algorithm for adjusting the phase window. In such manner, the slice level may be adjusted without further circuitry or additional processing.

As shown in FIG. 4, method 200 may begin by counting a number of data transitions occurring in a forbidden zone at a current slice level (block 210). The forbidden zone discussed in regard to FIG. 4 may correspond to the phase window of FIG. 3. Further, the count operation of block 210 may correspond to block 120 of FIG. 3. That is, in an implementation in which a phase window and slice level are adjusted using a single algorithm, the count may be performed a single time per algorithm iteration.

Next it may be determined whether there are more transitions at the current slice level than at a previous slice level (diamond 220). That is, in accordance with method 200, the slice level may be adjusted from a first time to a second time, where the previous slice level may correspond to a prior iteration of the algorithm. If the current slice level has more data transitions, this means that more data errors are present at the current slice level than the previous slice level. Accordingly, a prior iteration of the algorithm that adjusted the slice level from the previous slice level to the current slice level was in the wrong direction. Thus, a slice increment value may be changed to an opposite polarity (block 230). The slice increment value may be selected to be small enough so that when method 200 toggles between a few slice values, the overall system BER is not significantly increased. In certain embodiments, the slice increment value may be between approximately 100 µV and 1 mV. Then control passes to block 240.

If instead at diamond 220 there are fewer transitions at the current slice level than the previous slice level, control may pass directly to block 240. That is, if there are fewer transitions at the current slice level than the previous slice level, there are fewer bit errors, and the horizontal opening of the data eye is getting larger. Accordingly, the slice level may be adjusted using the slice increment value (block 240).

In such manner, the slice level may be incremented if in fact fewer bit errors are occurring, whereas if control passes to block 240 from block 230, the slice level is decremented by the opposite polarity slice increment value. Thereafter, control passes to block 210, where the method may continue counting the number of transitions in the forbidden zone at the new slice adjust level.

In other words, the slice level may be adjusted according to a trial and error basis such that the slice level is continuously adjusted. If the adjusted slice level leads to a wider data eye than the previous level, the slice level may be increasingly adjusted in that direction. In contrast, if an adjusted slice level leads to a smaller data eye (i.e., more data transitions in the forbidden zone), the slice level may be instead adjusted in the other direction.

In certain embodiments, the BER clock phase or forbidden zone may not be changed until it is determined that the slice level is moving in the proper direction. That is, multiple measurements may be made to determine the number of data transitions occurring at a first slicing level and a second slicing level. The BER phase moves only after the proper slice direction has been determined. That is, in certain embodiments, the actual phase window may not be adjusted until it is determined by trial and error that moving the phase window leads to fewer data transitions occurring within the phase window.

Figure 5:
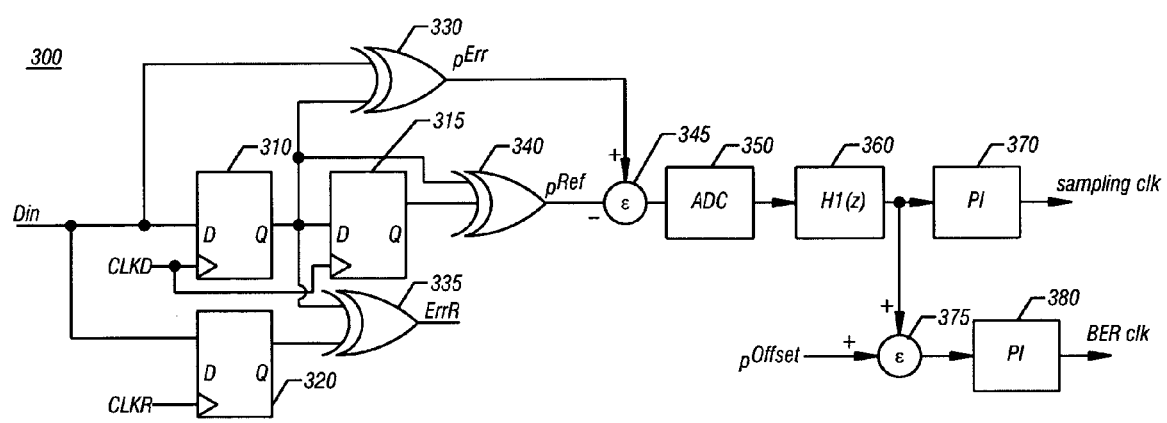
FIG. 5 is a block diagram of a portion of a clock and data recovery circuit in accordance with one embodiment of the present invention.

Referring now to FIG. 5, shown is a block diagram of a portion of a CDR in accordance with one embodiment of the present invention. More specifically, FIG. 5 shows a phase detector 300 used to determine the sampling clock frequency and error clock frequency. In some embodiment, the phase detector may be a Hogge phase detector or half rate linear phase detector. As shown in FIG. 5, phase detector 300 may receive incoming data (Din). For example, such incoming data may be received from a LA or AGC amplifier, which may be within an integrated circuit package including a CDR. The incoming data is sampled by a pair of samplers, namely a first latch 310 and a second latch 320. As shown in FIG. 5, latches 310 and 320 maybe D-type latches. First latch 310 may be clocked by the recovered data clock (i.e., CLKD), while second latch 320 may be clocked by the error clock (i.e., CLKR). The incoming data is also provided as an input into an exclusive-OR (XOR) logic gate 330.

As further shown in FIG. 5, first latch 310 has an output coupled to XOR 330, a third latch 315 and a second XOR 335. In turn, the output of second latch 320 is provided to second XOR 335. The output of second XOR 335 provides an error signal (ErrR), while the output of first XOR 30 provides a phase error signal (pErr). The output of first latch 310 is also provided to a third XOR 340, along with the output of third latch 315 to provide a phase reference signal (pRef).

In turn, the outputs of XORs 330 and 340 are subtracted in a summing block 345, the output of which is provided to an analog-to-digital converter (ADC) 350. The output of ADC 350 is provided to a digital filter 360. In other embodiments, ADC 350 may be removed and digital filter 360 may be replaced with a continuous time filter.

The output of digital filter 360 is provided to a phase interpolator 370, which generates the recovered data clock therefrom. The output of digital filter 360 is also provided to a summing block 375, along with a phase offset value (pOffset), which may be obtained from phase adjustment circuitry (not shown in FIG. 5). The phase offset signal may correspond to the phase window between the sampling clock and the BER clock. The output of summing block 375 is provided to a phase interpolator 380, which generates the error clock signal therefrom.

In various embodiments, a single CDR may both recover data and also continuously monitor the eye opening using the samplers associated with the data clock and error clock. In such manner, the CDR may operate using lower power than an implementation having multiple CDR's, one for recovering data and one for determining an optimal eye opening.

While shown in FIG. 5 as having single-ended inputs, it is to be understood that in other embodiments, differential signals may be provided to the various components.

Figure 6:
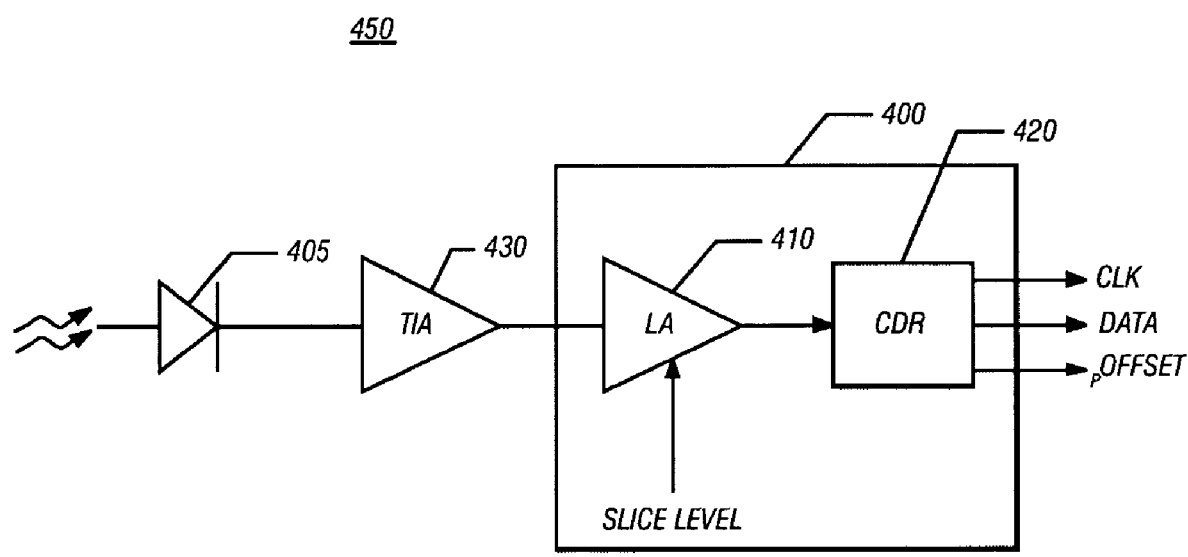
FIG. 6 is a block diagram of a portion of a system in accordance with one embodiment of the present invention.

Referring now to FIG. 6, shown is a block diagram of a portion of a system in accordance with one embodiment of the present invention. System 450 may be a part of an optical system, such as an optical receiver. As shown in FIG. 6, system 450 receives incoming optical signals, which may be obtained from an optical fiber or other such source, via a photodetecter 405, which converts the incoming optical energy into electrical current. Then, a transimpedance amplifier (TIA) 430 may convert the electrical current to voltage signals. From the output of TIA 430, voltage signals are provided to an integrated circuit 400 as an incoming data stream. As shown in FIG. 6, integrated circuit 400 may include a LA 410 and a CDR 420. Specifically, the incoming data may be provided to LA 410 for amplification. As shown in FIG. 6, a slice level offset signal (SLICE LEVEL) may be provided to give a desired offset adjustment value to limit amplifier 410. For example, the slice level offset may be referred to a front-end gain block of limit amplifier 410. The slice level offset signal may be automatically generated using information from data transitions occurring in a forbidden zone, as discussed above.

The output of LA 410 is provided to CDR 420. As an example, CDR 420 may include the phase detector of FIG. 5. Accordingly, CDR 420 may generate outputs including recovered data (DATA) as well as a recovered clock signal (CLK), along with a phase-offset signal (pOffset) which may report on the signal quality. Specifically, this signal may be representative of the horizontal data eye opening. For example, in one embodiment the signal may represent a value corresponding to a width of the forbidden zone. Such a signal may be used in other portions of an optical system to monitor system operation. For example, the signal may be used in a feedback loop or to initiate an alarm. Such a signal is more instructive than a LOS indicator, and may provide an earlier warning of an impending loss of signal. Furthermore, this signal quality metric may be reported without using any additional circuitry or consuming additional power.

While shown with the particular components present in FIG. 6, it is to be understood that a system in accordance with an embodiment of the present invention may include additional components, and the components present in FIG. 6 may be differently arranged. For example, while integrated circuit 400 is shown to include a LA and a CDR, such components may be in different packages in other embodiments and, of course, additional components may be present in integrated circuit 400.

While adjustments to the phase window and slicing level may be performed upon start up of a system including a CDR, in various embodiments such adjustments may be continually performed, as data may change over time during system operation. For example, changes may occur over time due to temperature, vibrations on an optical fiber line, aging, and the like.

In some embodiments, adjusting the phase window and automatically determining a slice level via forbidden zone transitions may be performed in connection with adjusting a phase of the sampling clock. For example, the sampling clock may be adjusted to calibrate out systematic phase offsets within the CDR. That is, an optimal phase sampling point for a data eye may vary, depending upon different optical components used, fiber lengths, and the like.

In certain embodiments, adjusting a phase window and a slice level may be effected using software (or a combination of software, firmware and hardware) that may be executed within a system, such as a receiver, CDR, or other component. Such embodiments may include an article in the form of a machine-readable storage medium onto which there are stored instructions and data that form a software program to perform such methods of adjusting a phase window and slice level.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   determining a number of data transitions occurring in a forbidden zone at each of a first slice level and a second slice level; and
   adjusting a slice level offset for an amplifier based on the number of data transitions at the first slice level and the second slice level.

2. The method of claim 1, wherein the first slice level comprises a current slice level and the second slice level comprises a previous slice level.

3. The method of claim 1, wherein determining the number of data transitions comprises measuring a data eye opening.

4. The method of claim 1, further comprising adjusting the forbidden zone to attain a predetermined bit error rate.

5. The method of claim 1, further comprising reporting a signal quality metric while automatically adjusting the forbidden zone.

6. The method of claim 4, further comprising adjusting the forbidden zone along an edge of a data eye formed of incoming signals.

7. The method of claim 2, wherein adjusting the slice level offset comprises adjusting the slice level offset to the first slice level if the number of data transitions at the first slice level is less than the number of data transitions at the second slice level.

8. The method of claim 2, wherein adjusting the slice level offset comprises adjusting the slice offset to the second slice level if the number of data transitions at the first slice level is greater than the number of data transitions at the second slice level.

9. The method of claim 1, further comprising applying the slice level offset to the amplifier.

10. A method comprising:
    measuring a number of data transitions in a forbidden zone of a data eye; and
    adjusting the forbidden zone if the number of data transitions is below a predetermined bit error rate.

11. The method of claim 10, wherein adjusting the forbidden zone comprises increasing a size of the forbidden zone.

12. The method of claim 11, further comprising increasing a phase difference between a sampling clock and an error clock.

13. The method of claim 12, wherein the error clock is along an edge of the data eye.

14. The method of claim 10, wherein the predetermined bit error rate is less than a selected deterministic jitter value.

15. The method of claim 14, further comprising adjusting the forbidden zone if the number of data transitions is greater than the predetermined bit error rate.

16. The method of claim 15, wherein adjusting the forbidden zone comprises decreasing a size of the forbidden zone.

17. The method of claim 10, further comprising measuring the number of data transitions at a first slice level and at a second slice level.

18. The method of claim 17, further comprising changing a slice level offset to the second slice level if fewer data transitions occur at the second slice level.

19. An integrated circuit comprising:
    an amplifier to receive an incoming signal and a slice level input; and
    a recovery circuit coupled to the amplifier, the recovery circuit to adjust the slice level input based on a comparison of data transitions occurring in a forbidden zone at a first slice level and a second slice level.

20. The integrated circuit of claim 19, wherein the first slice level comprises a current slice level and the second slice level comprises a previous slice level.

21. The integrated circuit of claim 20, wherein the recovery circuit to adjust the slice level input to the first slice level if the number of data transitions at the first slice level is less than the number of data transitions at the second slice level.

22. The integrated circuit of claim 20, wherein the recovery circuit to adjust the slice level input to the second slice level if the number of data transitions at the first slice level is greater than the number of data transitions at the second slice level.

23. The integrated circuit of claim 19, wherein the recovery circuit to report a signal quality metric based on the forbidden zone.

24. The integrated circuit of claim 19, wherein the recovery circuit comprises a phase detector to generate a sampling clock and an error clock.

25. The integrated circuit of claim 24, wherein the phase detector comprises a first path to generate the sampling clock, the first path comprising:
- a first digital filter to receive a digitized value of the incoming signal; and
- a first phase interpolator coupled to the first digital filter to output the sampling clock.

26. The integrated circuit of claim 25, wherein the phase detector comprises a second path to generate the error clock, the second path comprising:
- the first digital filter;
- a summing node coupled to combine an output of the first digital filter with a phase offset value; and
- a second phase interpolator coupled to the summing node to output the error clock.

27. An article comprising a machine-readable storage medium containing instructions that enable a system to:
- measure a number of data transitions occurring in a forbidden zone of a data eye; and
- adjust the forbidden zone if the number of data transitions is below a predetermined bit error rate.

28. The article of claim 27, further comprising instructions that enable the system to measure the number of data transitions at a first slice level and at a second slice level.

29. The article of claim 28, further comprising instructions that enable the system to change a slice level offset to the second slice level if fewer data transitions occur at the second slice level.

* * * * *